(12) United States Patent
Asai

(10) Patent No.: US 9,232,103 B2
(45) Date of Patent: Jan. 5, 2016

(54) TERMINAL APPARATUS AND COMPUTER READABLE MEDIUM

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/489,133

(22) Filed: Sep. 17, 2014

(65) Prior Publication Data
US 2015/0077781 A1    Mar. 19, 2015

(30) Foreign Application Priority Data
Sep. 18, 2013   (JP) .................................. 2013-193381

(51) Int. Cl.
G06F 3/12     (2006.01)
H04N 1/00    (2006.01)

(52) U.S. Cl.
CPC ........ *H04N 1/00915* (2013.01); *H04N 1/00307* (2013.01); *H04N 1/00389* (2013.01); *H04N 1/00411* (2013.01); *H04N 1/00474* (2013.01); *H04N 1/00482* (2013.01); *H04N 1/00954* (2013.01); *H04N 2201/0075* (2013.01)

(58) Field of Classification Search
None
See application file for complete search history.

(56) References Cited

U.S. PATENT DOCUMENTS

| 4,991,972 | A  | * | 2/1991  | Ikenoue et al. .............. 358/1.14 |
| 6,553,431 | B1 | * | 4/2003  | Yamamoto et al. ................ 710/8 |
| 6,609,162 | B1 |   | 8/2003  | Shimizu et al. |
| 7,002,702 | B1 | * | 2/2006  | Machida ....................... 358/1.15 |
| 8,019,853 | B2 |   | 9/2011  | Machida |
| 2005/0055641 | A1 |   | 3/2005  | Machida |
| 2009/0103124 | A1 | * | 4/2009  | Kimura et al. ............... 358/1.15 |
| 2014/0376045 | A1 | * | 12/2014 | Oyoshi ....................... 358/1.15 |

FOREIGN PATENT DOCUMENTS

| JP | 2000-187573 A | 7/2000 |
| JP | 2000-315182 A | 11/2000 |
| JP | 2004-320621 A | 11/2004 |
| JP | 3787434 B2    | 6/2006 |

OTHER PUBLICATIONS

Jun. 30, 2015—Co-pending U.S. Appl. No. 14/754,803.
Jun. 30, 2015—Co-pending U.S. Appl. No. 14/754,872.

* cited by examiner

*Primary Examiner* — Ashish K Thomas
*Assistant Examiner* — Neil R McLean
(74) *Attorney, Agent, or Firm* — Banner & Witcoff, Ltd.

(57) ABSTRACT

Aspects of the disclosure provide a terminal apparatus communicable with a plurality of external devices, which includes an input device and an output device, via a network. The terminal device includes a controller configured to execute a main function including an input function to be executed by the input device and an output function to be executed by the output device. When a cancel command is received, the controller may cancel execution of the input function or cancel execution of the output function.

20 Claims, 10 Drawing Sheets

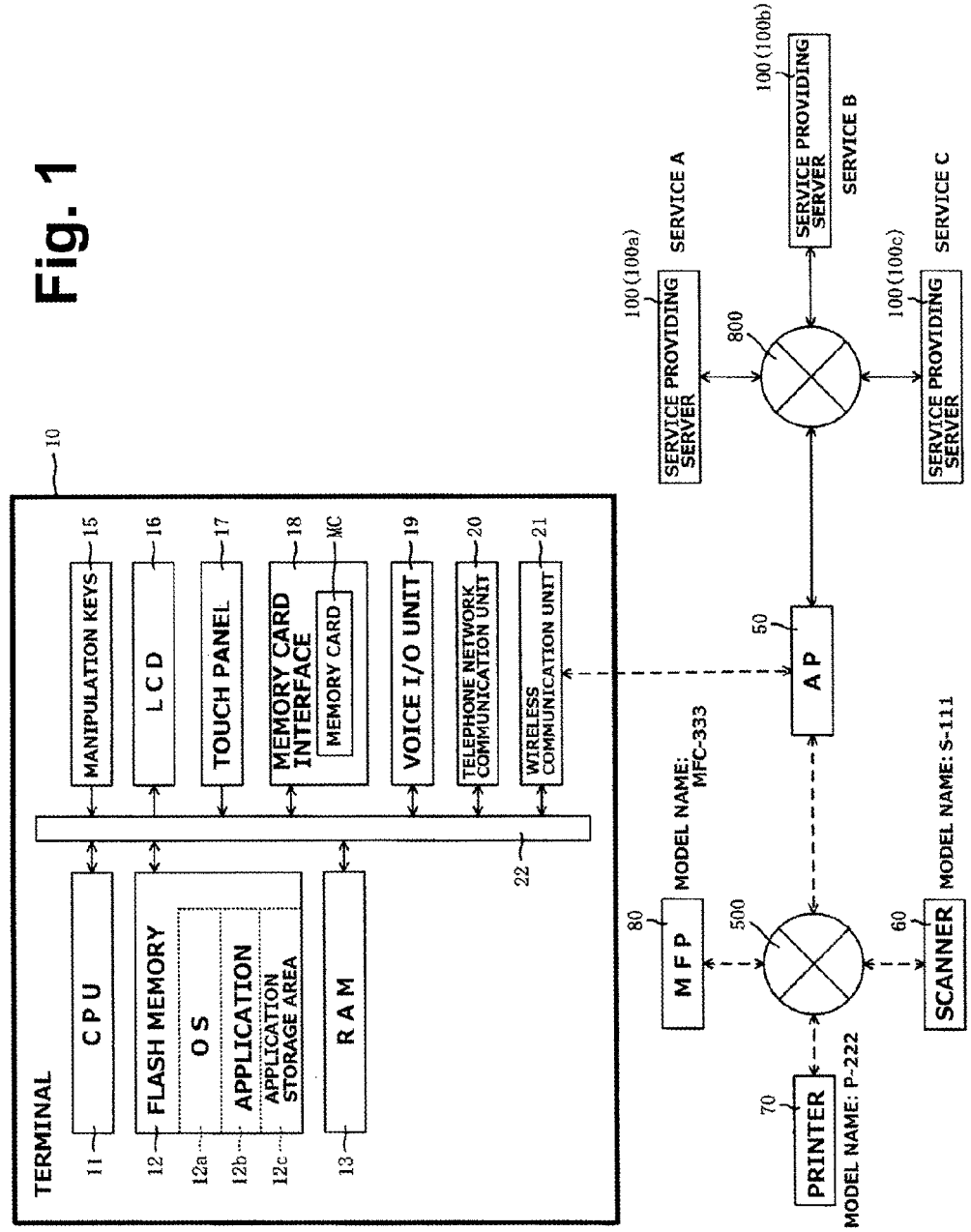

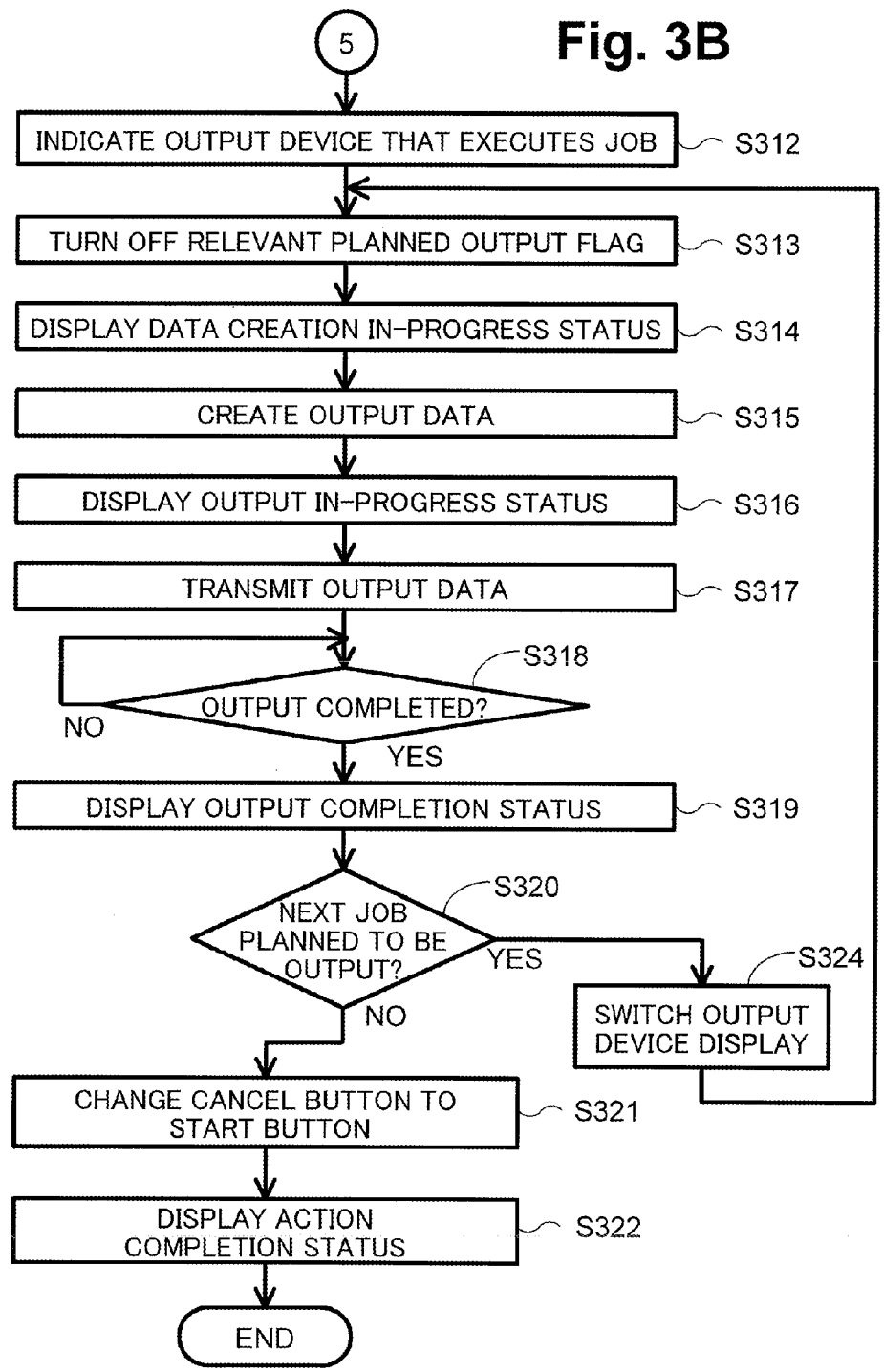

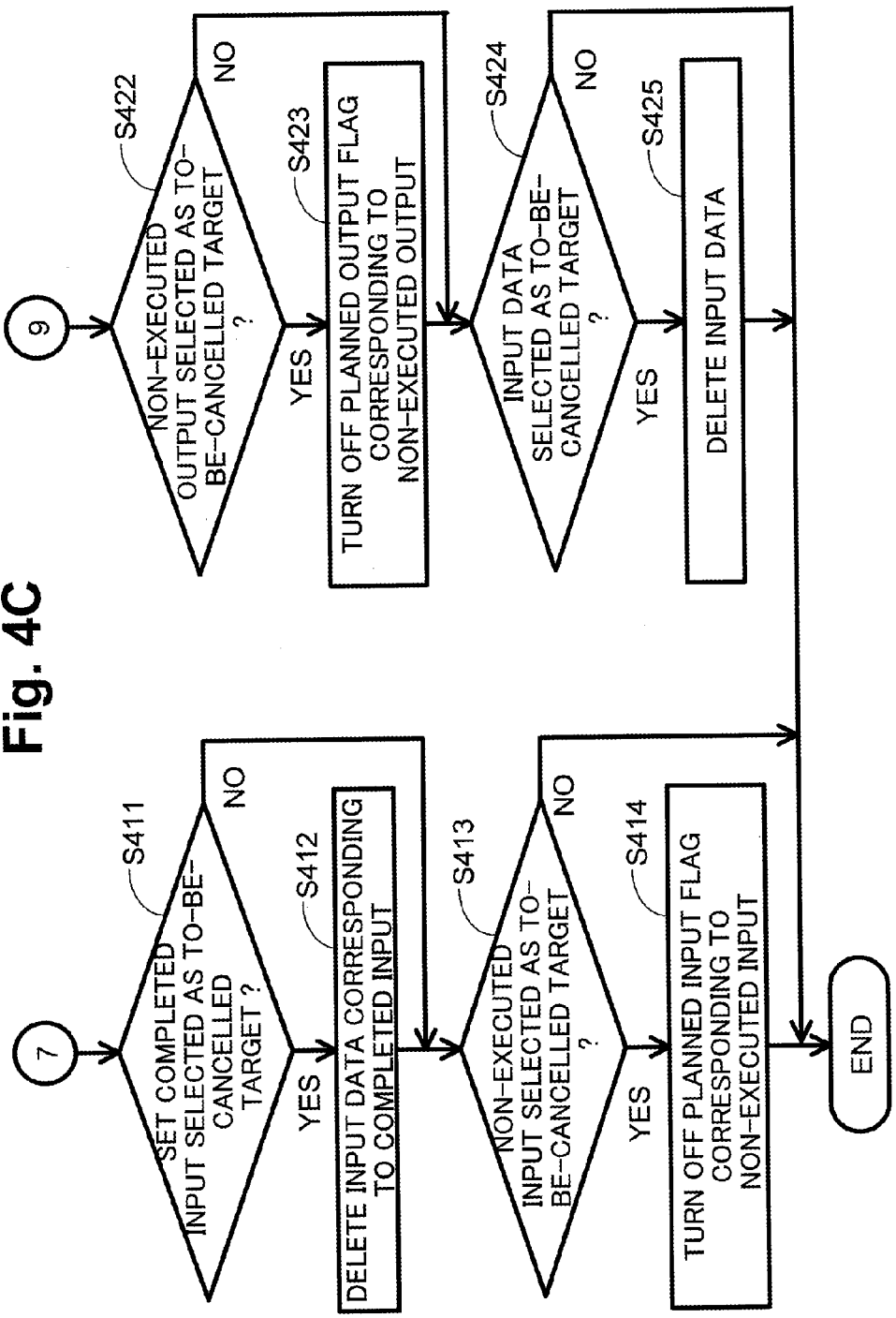

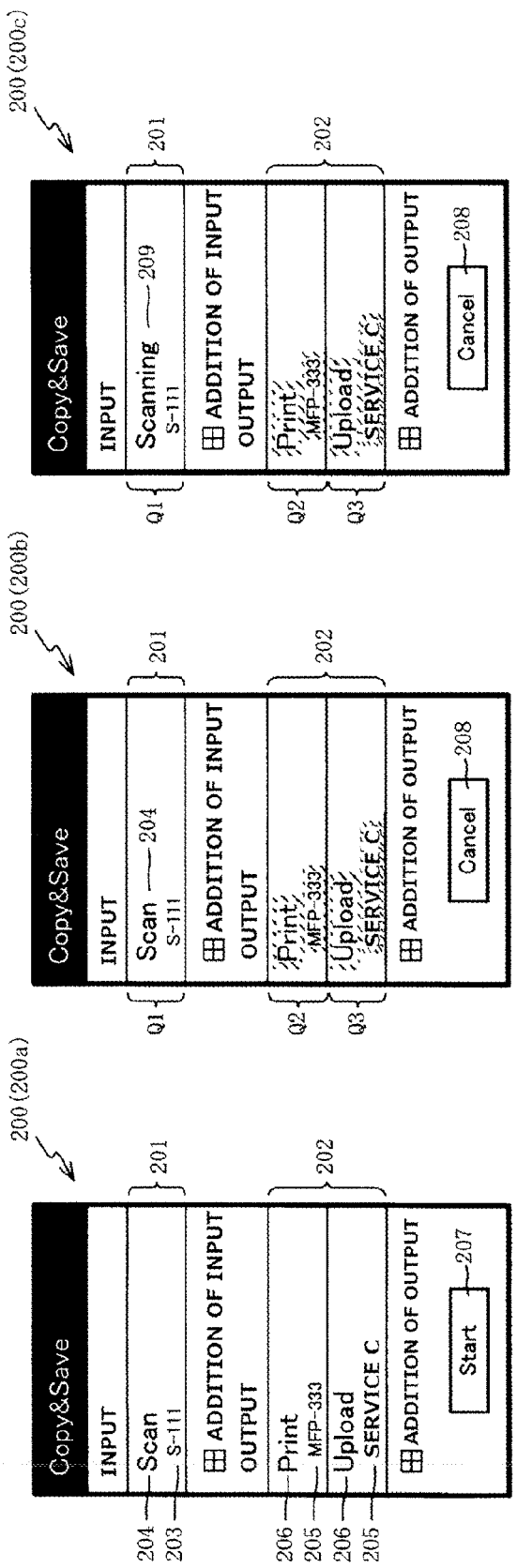

TERMINAL APPARATUS AND COMPUTER READABLE MEDIUM

CROSS-REFERENCE TO RELATED APPLICATION

This application claims priority from Japanese Patent Application No. 2013-193381, filed on Sep. 18, 2013, which is incorporated herein by reference in its entirety.

TECHNICAL FIELD

The present invention relates to a terminal apparatus communicable with external devices.

BACKGROUND

When a user selects one from a plurality of functions that can be implemented by a combination of a plurality of devices on a network and an image processing apparatus, a technology known in the prior art selects, from the plurality of devices on the network, a device to be combined with the image processing apparatus to implement the selected function and controls communication with the selected device.

SUMMARY

Once the execution of a function to be implemented is started by using the above technology to combine a device connected to the network with the image processing apparatus, it has not been easy to comprehend the state of each device on the network. In a case in which the execution of the function is to be cancelled, therefore, it has not been also easy to identify a device to which to issue a cancel command.

The present invention addresses the above problem with the object of providing an information processing program and a terminal apparatus that can easily cancel the execution of a prescribed function that is to be implemented by using a device connected to a network in combination.

Aspects of the disclosure provide a terminal apparatus communicable with a plurality of external devices, which includes an input device and an output device, via a network. The terminal device includes a controller configured to execute main function including an input function to be executed by the input device and an output function to be executed by the output device. When a cancel command is received, the controller may cancel execution of input function or execution of output function.

DESCRIPTION OF THE DRAWINGS

FIG. 1 is a block diagram illustrating the electric structure of a terminal.

FIGS. 3A and 3B illustrate a flowchart of action execution processing.

FIGS. 4A to 4C illustrate a flowchart of job cancel processing.

FIGS. 5A to 5E each schematically illustrate an example of an action execution screen.

DETAILED DESCRIPTION

Figure 2A:
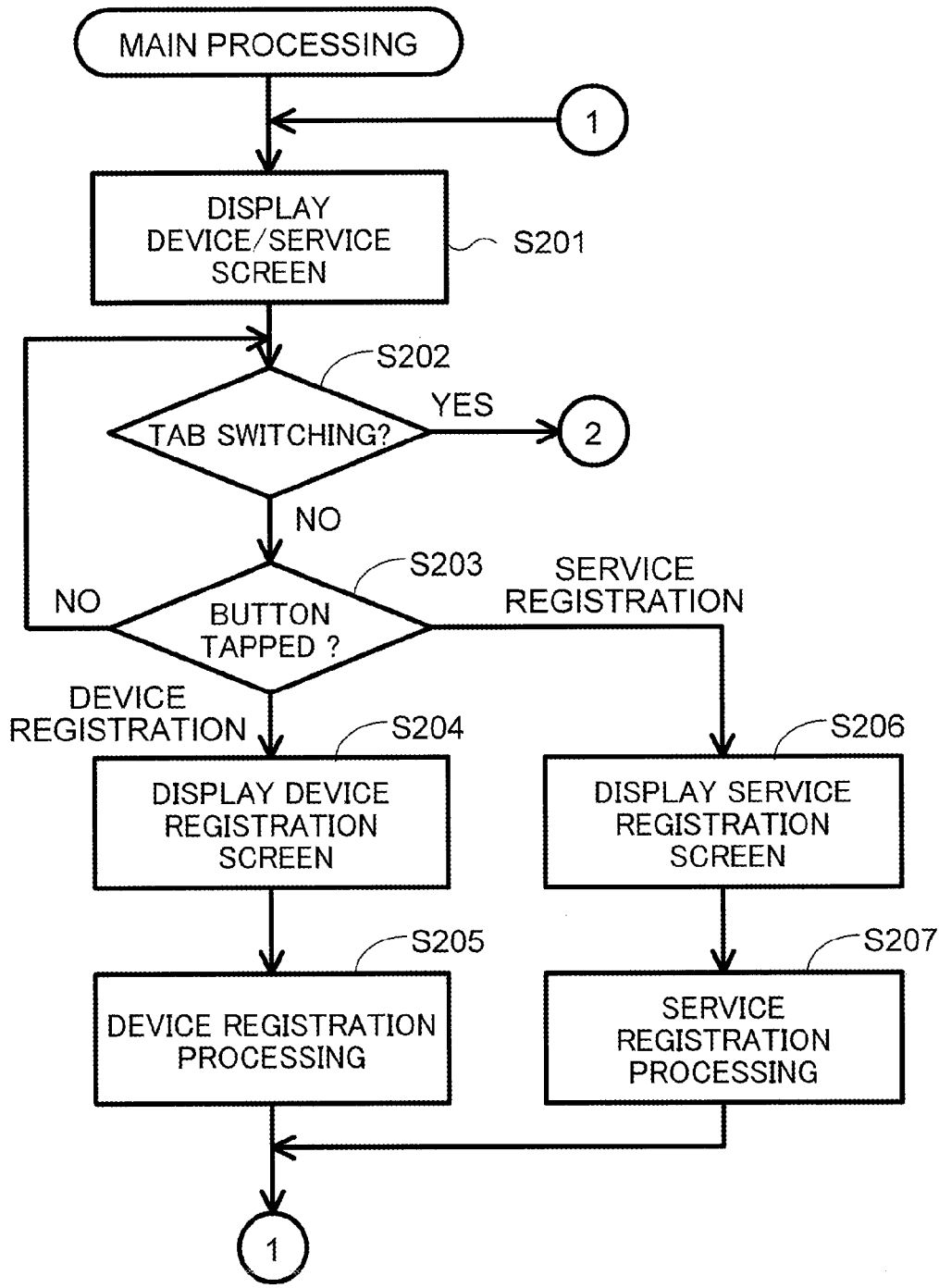
FIGS. 2A and 2B illustrate a flowchart of main processing.

Preferred embodiments of the present invention will be described below with reference to the attached drawings. FIG. 1 is a block diagram illustrating the electric structure of a terminal 10 in which an application 12b, which is an embodiment of an information processing program in the present invention.

The terminal 10 in this embodiment is structured as a smart phone or another mobile terminal. The terminal 10 includes a central processing unit (CPU) 11, a flash memory 12, a random-access memory (RAM) 13, manipulation keys 15, a liquid crystal display (LCD) 16, a touch panel 17, a memory card interface 18, a voice input/output unit 19, a telephone network communication unit 20, and a wireless communication unit 21. These components are mutually connected through a bus line 22.

The CPU 11 controls the components connected to the bus line 22 according to, for example, fixed values and a program that are stored in the flash memory 12 or another type of memory. The flash memory 12 is a rewritable non-volatile memory. In the flash memory 12, an operating system 12a and the application 12b are stored. In the descriptions below, the operating system may be referred to as the OS and the CPU 11 that executes an application, the operating system, and other programs may be indicated simply by a program name. For example, the term "application" may indicate the CPU 11 that executes the application. The OS 12a is basic software that implements the standard functions of the terminal 10. The OS 12a in this embodiment is an Android (registered trademark) OS.

The application 12b is one of applications provided by the vendors of various devices. The application 12b is installed in the terminal 10 by the user, after which the user can use the relevant device from the terminal 10. The application 12b in this embodiment enables the terminal 10 to use a scanner 60, a printer 70, a multi-function peripheral (MFP) 80, and other devices connected to a wireless local area network (LAN) 500 without passing through, for example, a personal computer.

Although described later in detail, the application 12b in this embodiment is structured so that a certain function is implemented by using an input device and an output device that are appropriately selected from various types of devices connected to the wireless LAN 500 and from various service providing servers 100, which provide various types of services, connected to the Internet 800. To be more specific, the application 12b links the input function of an input device and the output function of an output device together to implement a certain function, which includes the input function and output function.

An input function executed by an input device is a function of fetching data that the terminal 10 including the application 12b receives as input data or to read out the data from a storage unit in which the data is stored. Examples of the input function include a scan function of reading an original image and a facsimile reception function of receiving image data from an external device. Another example of the input function is a function of reading data from a recording media such as an internal memory or a memory card or from a storage unit such as a database.

An output function executed by an output device is a function of producing an output according to data output by the terminal 10 including the application 12b as output data or a function of recording (storing) the data in a storage unit. If, for example, the output data is image data, a print function of producing an image to be printed according to the image data and a facsimile transmission function of transmitting the image data to an external device are also output functions. Another example of the output function is a function of storing data in a recording media such as an internal memory or a memory card or in a storage unit such as a database.

In the descriptions below, a certain function including an input function and an output function may be particularly referred to as a main function. If, for example, the scanner 60 and printer 70 are respectively selected as an input device and an output device, the application 12b can implement a so-called copy function as a main function, in which case the application 12b links the scan function of the scanner 60 and the print function of the printer 70 together so that the image data of an original image is read by the scanner 60 and is then output from the printer 70 as a printed image.

In particular, when an input device and an output device are used to implement a main function including the input function of the input device and the output function of the output device, the application 12b in this embodiment is structured so the main function can be easily cancelled while it is being executed. Processing in the flowcharts in FIGS. 2A to 4C, which will be described later, is executed by the CPU 11 under control by the application 12b.

The flash memory 12 includes an application storage area 12c. The application storage area 12c is allocated to the application 12b and used by the application 12b. The application storage area 12c stores, for example, devices registered by the user as selectable candidates of input devices or output devices (these devices will be referred to below as the registered devices) and actions registered by the user. An action is a set of main functions. In this embodiment, one or a plurality of main functions can be associated with one action. When a command to execute one action is issued, one or a plurality of main functions associated with the action is executed.

The RAM 13 is a rewritable volatile memory that has a temporary area, in which various types of data used by the CPU 11 to execute the application 12b or the like is temporarily stored. When, for example, a main function is executed, data received from an input device (that is, input data) and data created from the input data and output to an output device (that is, output data) are stored in the temporary area in the RAM 13.

The manipulation keys 15 are mechanical keys used to input a command and the like to the terminal 10. The manipulation keys 15 are provided on, for example, the case of the terminal 10. The LCD 16 displays various screens. The touch panel 17, which is overlaid on the LCD 16, inputs a command and the like to the terminal 10 when the user touches the touch panel 17 with a finger, a rod, or another indicating body or brings it close to the touch panel 17. The memory card interface 18 is an interface in which a rewritable non-volatile memory card MC is mounted. The memory card interface 18 controls the writing and reading of data and files to and from the memory card MC. The voice input/output unit 19 is a voice input/output device structured with a microphone, a speaker, and the like. The telephone network communication unit 20 is a circuit used to make a call through a mobile telephone network (not illustrated).

The wireless communication unit 21 is an interface used for wireless communication through a wireless LAN. In this embodiment, communication performed by the wireless communication unit 21 is wireless communication through a wireless LAN complying with the IEE802.11b/g standard. In this embodiment, the wireless communication unit 21 is connected to the wireless LAN 500 through an access point (AP) 50, which is a relay unit. Then, the terminal 10 is connected to the scanner 60 and other various devices on the wireless LAN 500, to which the terminal 10 is connected through the AP 50, so as to communicate with these devices.

The AP 50, which has a broad-band router function, can be connected to the Internet 800. Thus, the terminal 10 can access various service providing servers 100 connected to the Internet 800 and can use services provided by the accessed service providing servers 100. Examples of services provided by the service providing servers 100 include Dropbox (registered trademark), Evernote (registered trademark), and other various services. If, for example, servers 100a, 100b, and 100c are connected to the Internet 800 as the service providing servers 100 as illustrated in FIG. 1, the terminal 10 can access the servers 100a, 100b, and 100c and can use a service A, a service B, and a service C, which are respectively provided by the servers 100a, 100b, and 100c.

The scanner 60 is a single-function device having a scan function, and the printer 70 is also a single-function device having a print function. In this embodiment, the scanner 60 having a scan function alone can be selected only as an input device, and the printer 70 having a print function alone can be selected only as an output device.

The MFP 80 includes a print function, a scan function, a facsimile function, and other various types of functions. In this embodiment, when the scan function or the facsimile reception function, which is part of the facsimile function, of the MFP 80 is used, the MFP 80 can be selected as an input device. Similarly, when the print function or the facsimile transmission function, which is part of the facsimile function, of the MFP 80 is used, the MFP 80 can be selected as an output device. That is, the application 12b in this embodiment can select the MFP 80 as an input device and as an output device.

In the example illustrated in FIG. 1, the scanner 60 with a model name S-111, the printer 70 with a model name P-222, and the MFP 80 with a model name MFC-333 are connected as devices, one device for each type. In this embodiment, all devices connected to the wireless LAN 500 are independently identified from their model names and IP addresses assigned to the devices.

Figure 2B:
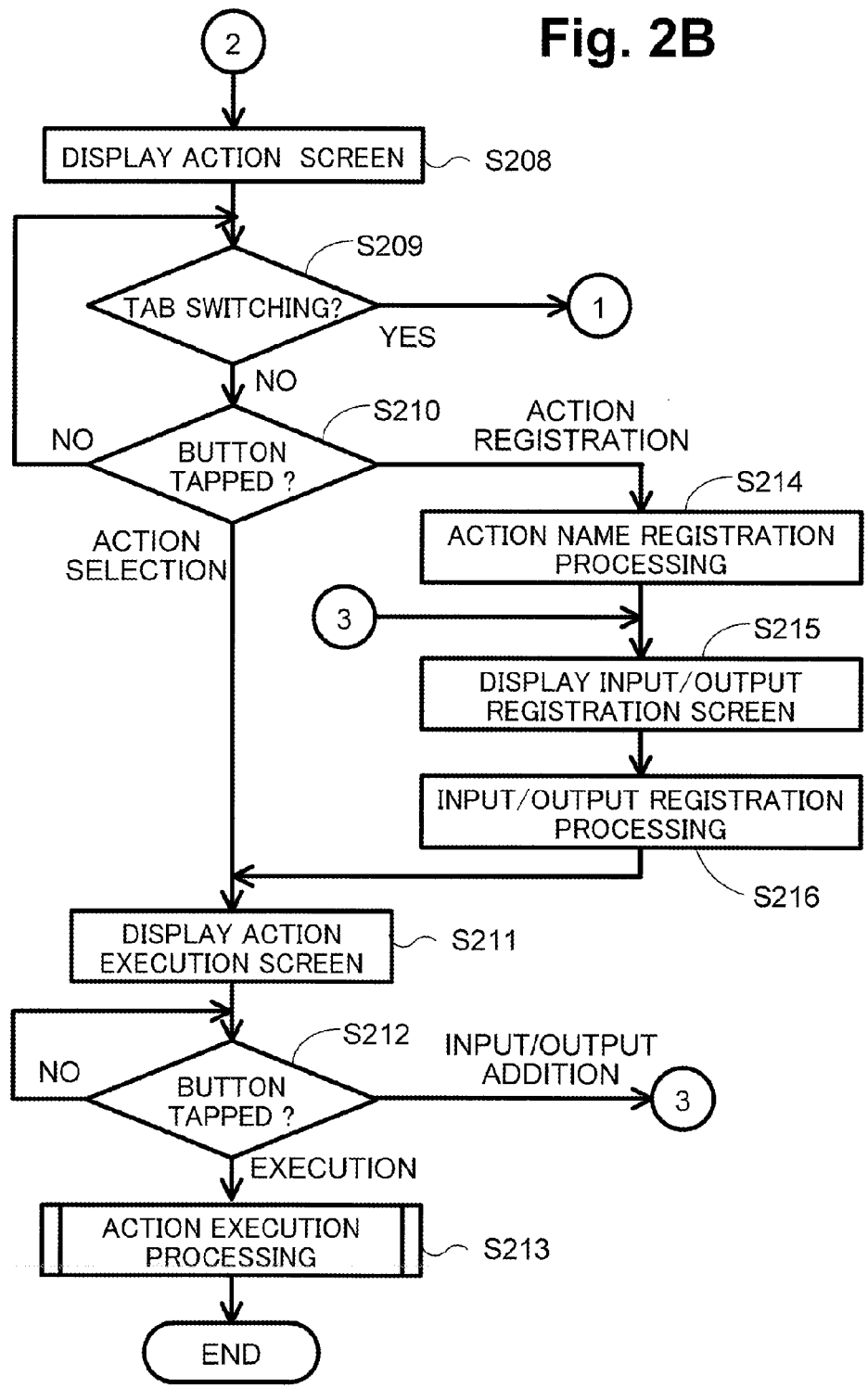

FIGS. 2A and 2B illustrate main processing executed by the CPU 11 in the terminal 10 under control by the application 12b. When the CPU 11 receives a command to start the application 12b, the main processing is started. The CPU 11 first displays a device/service screen (not illustrated) on the LCD 16; to be more specific, the CPU 11 displays the screen on the foreground (S201). The device/service screen is used to register devices, such as the scanner 60, and service providing servers 100 as selectable candidates of input devices or output devices. While the device/service screen is being displayed on the foreground, an action screen (not illustrated) on which the user selects a desired main function to be executed is displayed on the background.

A display on the foreground is a display that is actually drawn on the LCD 16, and a display on the background is a display that is not drawn on the LCD 16, in which case display processing is being carried out to provide a display on the LCD 16. One of the device/service screen and the action screen is displayed on the foreground and the other is displayed on the background according to a switchover between tabs, displayed on the LCD 16, that correspond to these screens.

Accordingly, if the CPU 11 receives a tab switching command with the device/service screen displayed on the foreground (the result in S202 is Yes), the CPU 11 displays the action screen on the foreground and displays the device/service screen on the background (S206). If the CPU 11 receives a tab switching command with the action screen displayed on the foreground (the result in S209 is Yes), the CPU 11 returns the process to S201, where the CPU 11 displays the device/service screen on the foreground and displays the action screen on the background (S201).

On the device/service screen, a device registration button to register a device and a service registration button to register a service are displayed. With the device/service screen displayed on the foreground, therefore, the CPU 11 waits for the device registration button or service registration button to be tapped (the result in S202 is No and the result in S203 is No).

If the CPU 11 accepts a tap of the device registration button (the result in S203 is "device registration"), the CPU 11 switches the screen to be displayed on the LCD 16 from the device/service screen to a device registration screen (not illustrated), on which a device is registered (S204). The CPU 11 then executes device registration processing, in which a device is registered according to the user's manipulation on the device registration screen (S205). Upon completion of the device registration processing in S205, the CPU 11 returns the processing to S201, where the CPU 11 switches the screen to be displayed on the LCD 16 from the device registration screen to the device/service screen.

If the CPU 11 accepts a tap of the service registration button (the result in S203 is "service registration"), the CPU 11 switches the screen to be displayed on the LCD 16 from the device/service screen to a service registration screen (not illustrated), on which a service is registered (S206). The CPU 11 then executes service registration processing, in which a service, more specifically, a service providing server 100 is registered according to the user's manipulation on the service registration screen (S207). Upon completion of the service registration processing in S207, the CPU 11 returns the processing to S201, where the CPU 11 switches the screen to be displayed on the LCD 16 from the service registration screen to the device/service screen.

On the action screen, buttons that enable the user to register actions, each of which includes one or a plurality of main functions (the buttons will be referred to below as the action registration buttons), and buttons corresponding to individual actions registered by the user (these buttons will be referred to as the action selection buttons) are displayed. With the action screen displayed on the foreground, therefore, the CPU 11 waits for an action registration button or action selection button to be tapped (the result in S209 is No and the result in S210 is No).

If the CPU 11 accepts a tap of an action registration button (the result in S210 is "action registration"), the CPU 11 executes action name registration processing (S214). Specifically, in the action name registration processing in S214, the CPU 11 switches the screen to be displayed on the LCD 16 from the action screen to an action name registration screen (not illustrated), on which a name to be assigned to an action to be newly registered is registered according to the user's manipulation on the action name registration screen (this name will be referred to below as the action name).

Upon completion of the action name registration processing in S214, the CPU 11 switches the screen to be displayed on the LCD 16 from the action name registration screen to an input/output registration screen (not illustrated) (S215). On the input/output registration screen, an input device and an output device are registered that are used to implement one or a plurality of main functions to be associated with an action identified by one registered action name.

The CPU 11 then executes input/output registration processing, in which an input device or output device is registered according to the user's manipulation on the input/output registration screen (S216). In the input/output registration processing in S216, a device registered in the device registration processing in S205 or a service providing server 100 registered in the service registration processing in S207 is selected and registered as the input device or output device.

With the application 12*b* in this embodiment, one or a plurality of input devices and one or a plurality of output devices can be registered for an action identified by one action name. That is, one main function having the input function of a registered input device and the output function of a registered output device in one-to-one correspondence can be associated with one action for each combination of a registered input device and a registered output device. Therefore, when one action name is selected, if a plurality of main functions is associated with the action identified by the one function name, all of the plurality of main functions can be executed.

Upon completion of the input/output registration processing in S216, the CPU 11 switches the screen to be displayed on the LCD 16 from the input/output registration screen to an action execution screen 200 (see FIGS. 5A to 5E) (S211). On the action execution screen 200, one of the registered actions is executed. To be more specific, when the action execution screen 200 is displayed on the LCD 16 after execution of the input/output registration processing in S216, an action registered in the input/output registration processing in S216 is executed on the action execution screen 200.

If the CPU 11 accepts a tap of one action selection button on the action screen (the result in S210 is "action selection"), the CPU 11 causes the processing to proceed to S211, where the CPU 11 switches the screen to be displayed on the LCD 16 from the action screen to the action execution screen 200. To be more specific, the action execution screen 200 displayed on the LCD 16 in response to a tap of the action selection button is a screen on which the action corresponding to the tapped action selection button is executed.

A button to additionally register an input device or an output device used to implement a main function is displayed on the action execution screen 200 (this button will be referred to below as the input/output addition button). A Start button 207 (see FIGS. 5A and 5E) that commands an action to be started is also displayed on the action execution screen 200.

With the action execution screen 200 displayed, therefore, the CPU 11 waits for the input/output addition button or Start button 207 to be tapped (the result in S212 is No). If the CPU 11 accepts a tap of the input/output addition button (the result in S212 is "input/output addition"), the CPU 11 causes the processing to proceed to S215, where the CPU 11 switches the screen to be displayed on the LCD 16 from the action execution screen 200 to the input/output registration screen.

If the CPU 11 accepts a tap of the Start button 207 (the result in S212 is "execution"), the CPU 11 executes action execution processing, in which action corresponding to the action execution screen 200, which is being displayed, is executed (S213), and terminates the main processing.

Figure 3A:
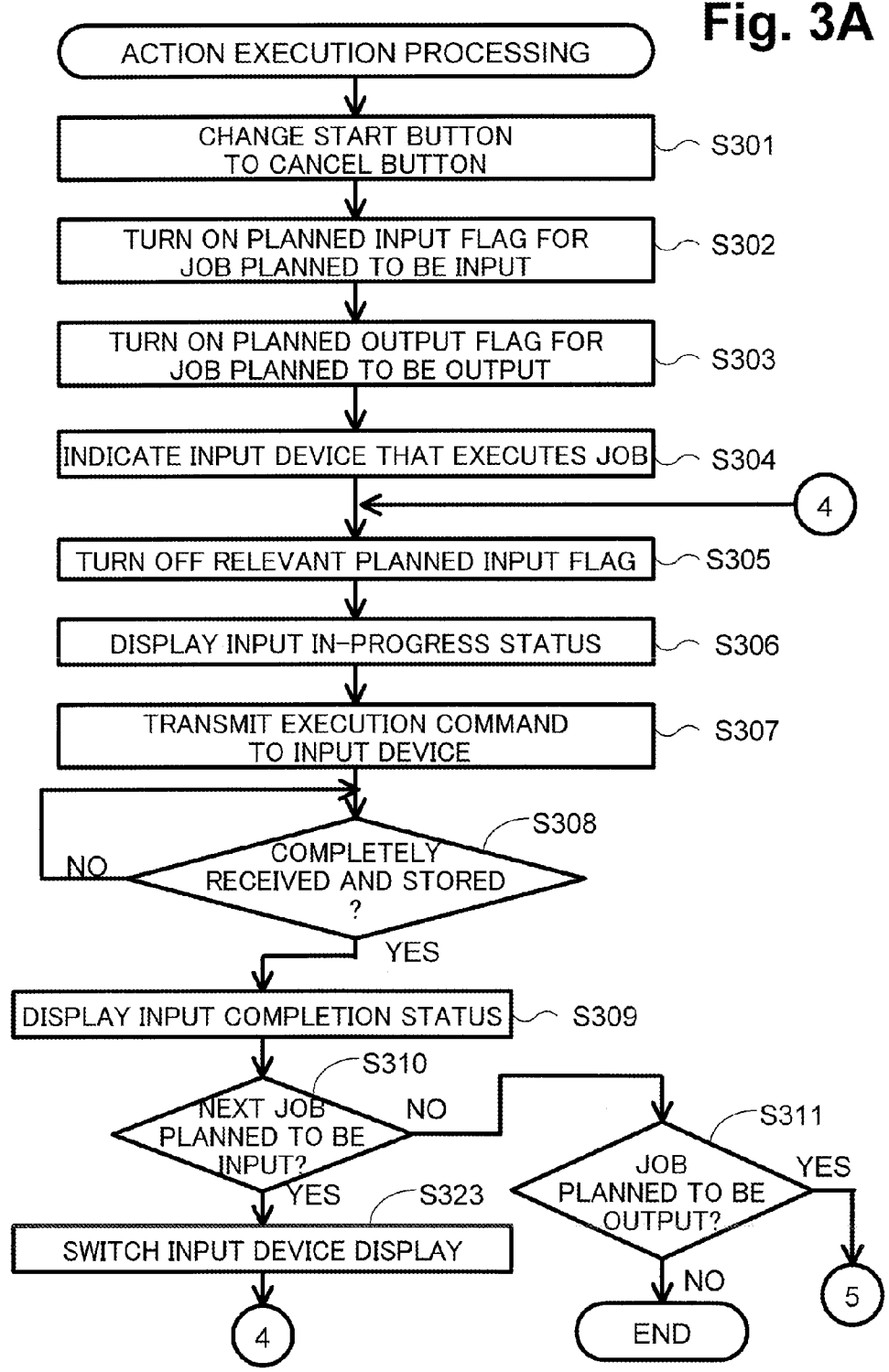

FIGS. 3A and 3B illustrate a flowchart of action execution processing in S213 described above. The CPU 11 first switches the button to be displayed on the action execution screen 200 from the Start button 207 to a Cancel button 208 (see FIGS. 5B to 5D) (S301). The CPU 11 turns on a planned input flag for each job planned to be input, which is a job to be executed by an input device registered for an action to be executed, that is, an input function (S302). The planned input flag, which indicates whether the job planned to be input has yet to be executed, is provided in the RAM 13. When the planned input flag is on, it indicates that the job planned to be input has yet to be executed. The planned input flag is off at the start of the main processing in FIGS. 2A and 2B.

The CPU 11 turns on a planned output flag for each job planned to be output, which is a job to be executed by an output device registered for an action to be executed, that is, an output function (S303). The planned output flag, which indicates whether the job planned to be output has yet to be executed, is provided in the RAM 13. When the planned output flag is on, it indicates that the job planned to be output has yet to be executed. The planned output flag is off at the start of the main processing in FIGS. 2A and 2B.

The CPU 11 indicates, on the action execution screen 200, an input device that will execute a job (the input device will be referred to below as the job-executing input device), which is one of the input devices registered for the action to be executed, in a different form from other input devices and output devices (S304). The CPU 11 then turns off the planned input flag corresponding to the job-executing input device (S305).

The CPU 11 displays an input in-progress status 209 (see FIG. 5C), which indicates that a job is being executed, that is, an input function is being executed, as the input status of the job-executing input device (S306). If, for example, the job-executing input device is the scanner 60, "Scanning", which indicates that scanning is in progress, is displayed as the input in-progress status 209.

The CPU 11 transmits a job execution command to the job-executing input device (S307). The CPU 11 then waits for input data, that is, data that the job-executing input device has obtained by executing an input function, to be completely received and for the received input data to be completely stored (the result in S308 is No). If input data has been completely received and stored (the result in S308 is Yes), the CPU 11 turns off the input in-progress status 209 on the action execution screen 200 and displays an input completion status 210 (see FIG. 5D), which indicates that input has been completed, instead (S309).

Next, the CPU 11 determines whether there is a next job planned to be input (S310). Specifically, if there is a turned-on planned input flag, the CPU 11 determines in S310 that there is a next job planned to be input. If the CPU 11 determines that there is a next job planned to be input (the result in S310 is Yes), the CPU 11 switches the input device display so as to indicate the next job-executing input device instead of the input device that has completed job execution (S323). Thus, the next job-executing input device is displayed in a different form from other input devices and output devices. Upon completion of the processing in S323, the CPU 11 causes the processing to return to S305 and executes the processing in S305 to S309 for the next job-executing input device.

If the CPU 11 determines that there is no next job planned to be input (the result in S310 is No), the CPU 11 determines whether there is a job planned to be output (S311). Specifically, if there is a turned-on planned output flag, the CPU 11 determines in S311 that there is a next job planned to be output. If the CPU 11 determines that there is no job planned to be output (the result in S311 is No), the CPU 11 terminates the action execution processing.

If the CPU 11 determines in S311 that there is a job planned to be output (the result in S311 is Yes), the CPU 11 indicates, on the action execution screen 200, an output device that will execute a job (the output device will be referred to below as the job-executing output device), which is one of the output devices registered for the action to be executed, in a different form from other input devices and output devices (S312). The CPU 11 then turns off the planned output flag corresponding to the job-executing input device (S313).

The CPU 11 displays an output in-progress status, which indicates that a job is being executed, that is, an output function is being executed, as the output status of the job-executing output device (S316). If, for example, the job-executing output device is the printer 70, "Printing", which indicates that printing is in progress, is displayed as the output in-progress status.

The CPU 11 transmits output data to the job-executing output device (S317). The CPU 11 then waits for the output data to be completely output (the result in S318 is No). If the output data has been completely output (the result in S318 is Yes), the CPU 11 turns off the output in-progress status displayed on the action execution screen 200 and displays an output completion status, which indicates output has been completed, instead (S319).

According to the state of the planned output flag, the CPU 11 then determines whether there is a next job planned to be output (S320). If the CPU 11 determines there is a next job planned to be output (the result in S320 is Yes), the CPU 11 switches the output device display so as to indicate the next job-executing output device instead of the output device that has completed job execution (S324). Thus, the next job-executing output device is displayed in a different form from other input devices and output devices. Upon completion of the processing in S324, the CPU 11 causes the processing to return to S313 and executes the processing in S313 to S319 for the next job-executing output device.

If the CPU 11 determines that there is no next job planned to be output (the result in S320 is No), the CPU 11 turns off the Cancel button 208 on the action execution screen 200 and displays the Start button 207 instead (S321). The CPU 11 then displays, on the action execution screen 200, an action completion status 211 (see FIG. 5E), which indicates that the action eligible for being executed, to be more specific, all main functions included in the action eligible for being executed, has been completely executed (S322), terminating the action execution processing.

Figure 4A:
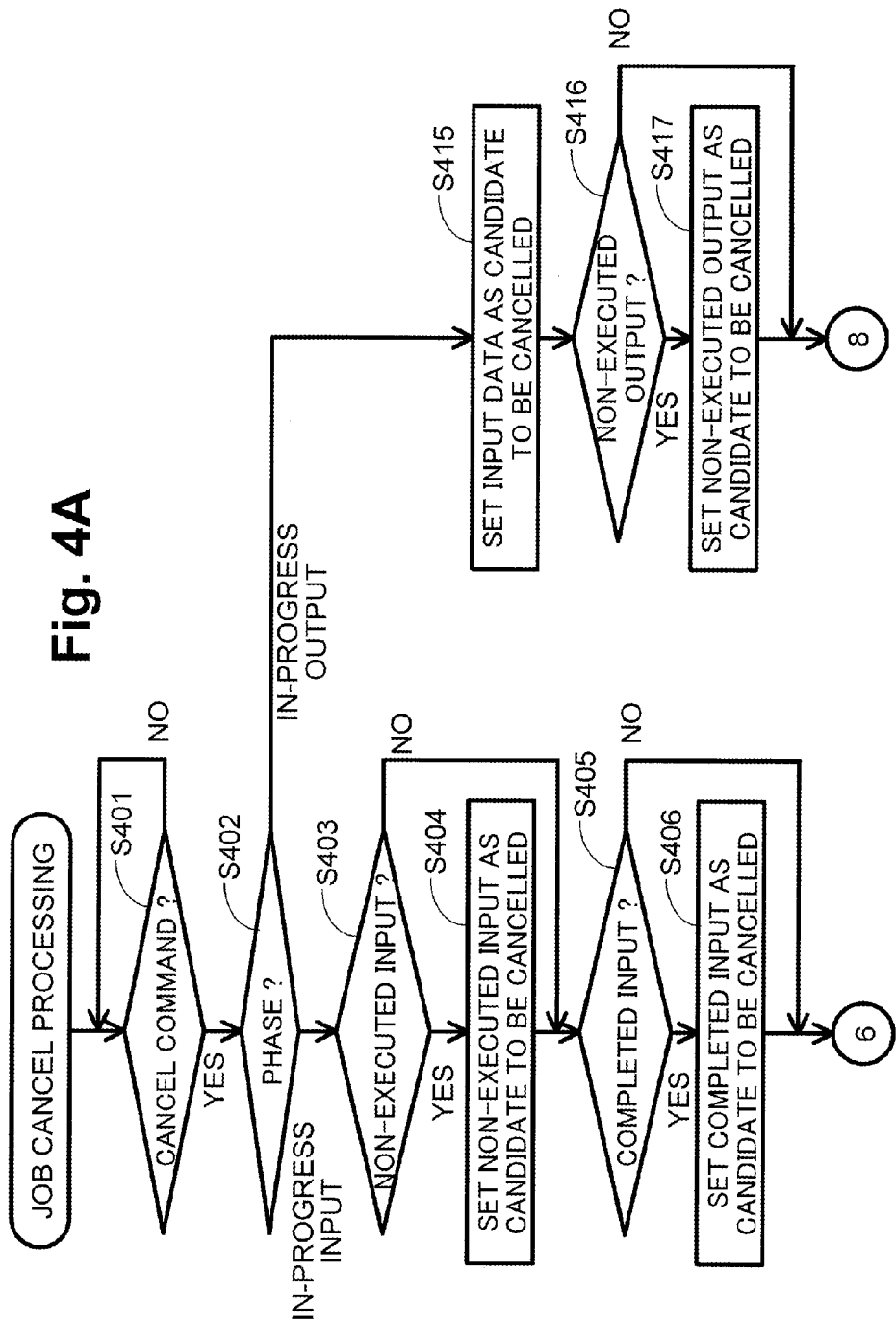
Figure 4B:
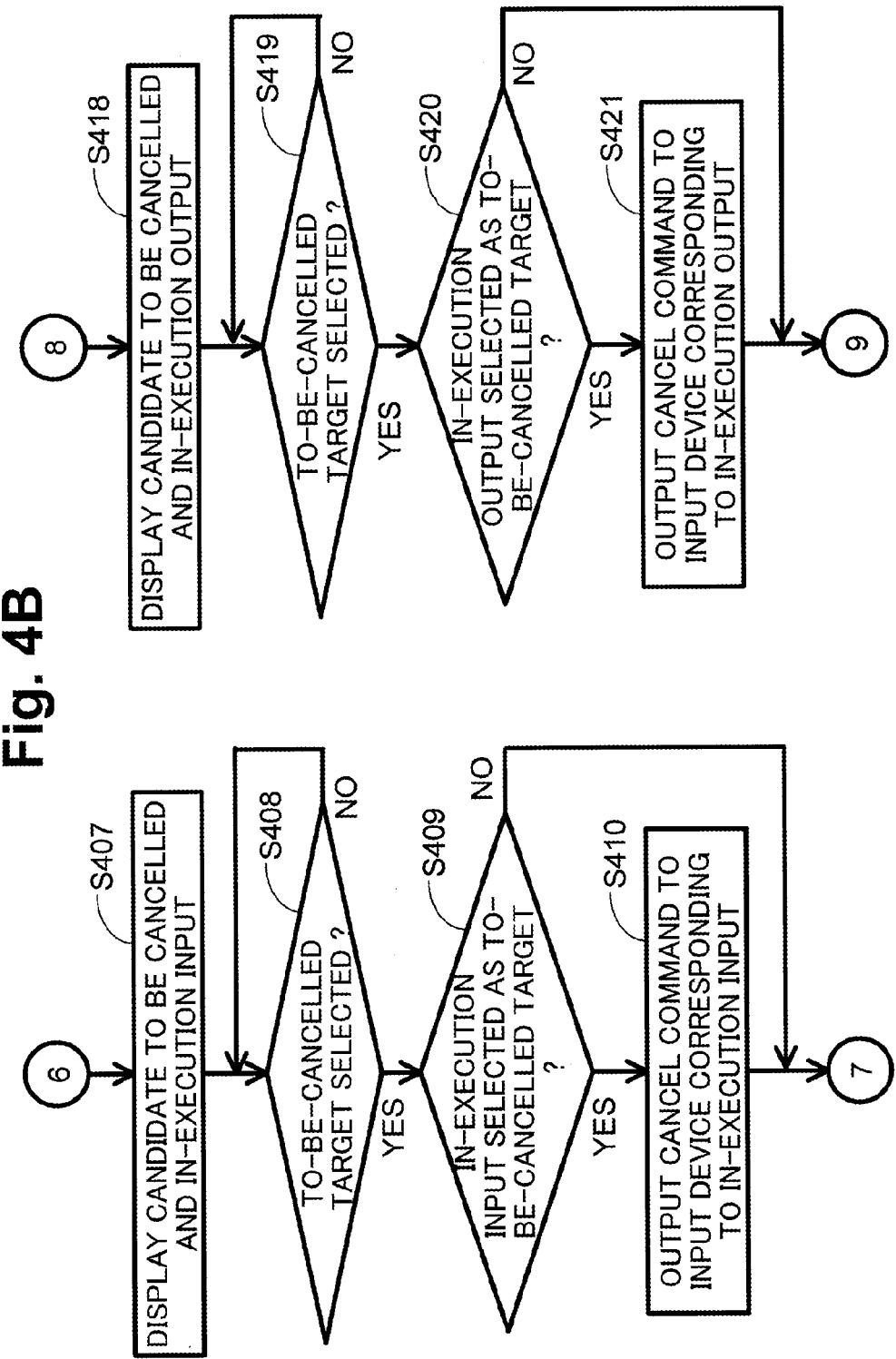

FIGS. 4A to 4C illustrate a flowchart of job cancel processing. This processing is a thread of processing different from the main processing described above with reference to FIGS. 2A and 2B; this processing and the main processing are concurrently executed. The job cancel processing is started when the CPU 11 accepts a command to start the application 12b, as in the main processing described above. The CPU 11 waits until the Cancel button 208 displayed on the action execution screen 200 is tapped (the result in S401 is No).

If the CPU 11 accepts a tap of the Cancel button 208 (the result in S401 is Yes) and if the phase of the action being executed is an in-execution input (the result in S402 is "in-progress input"), the CPU 11 executes the processing in S403 to S414. Specifically, according to the state of the planned input flag, the CPU 11 determines whether there is a non-executed input, that is, a job planned to be input (S403). If the CPU 11 determines that there is a non-executed input (the result in S403 is Yes), the CPU 11 sets the non-executed input as a candidate to be cancelled (S404) and causes the processing to proceed to S405. If the CPU 11 determines that there is no non-executed input (the result in S403 is No), the CPU 11 skips S404 and causes the processing to proceed to S405.

The CPU 11 determines in S405 whether there is a completed input, that is, a job for which input data has been already stored. If the CPU 11 determines that there is a completed input (the result in S405 is Yes), the CPU 11 sets the completed input as a candidate to be cancelled (S406) and causes the processing to proceed to S407. If the CPU 11 determines that there is no completed input (the result in S405 is No), the CPU 11 skips S406 and causes the processing to proceed to S407.

In S407, the CPU 11 displays the non-executed input, which has been set as a candidate to be cancelled in S404, the completed input, which has been set as a candidate to be cancelled in S406, and an in-execution input on the LCD 16 in a form in which they can be selected. An in-execution input is a job that is intended to be executed by an input device registered for an action to be executed and is being executed; an in-execution input is neither a non-executed input nor a completed input. The CPU 11 waits until the user selects a target to be cancelled (referred to below as the to-be-cancelled target) from the candidate to be cancelled and the in-execution input, which have been displayed in S407 (the result in S408 is No).

If the in-execution input is selected as the to-be-cancelled target (the result in S408 is Yes and the result in S409 is Yes), the CPU 11 outputs a cancel command to the input device corresponding to the in-execution input that has been selected as the to-be-cancelled target (S410) and causes the processing to proceed to S411. As a result in the processing in S410, the job being executed in the target input device, that is, the input function being executed is cancelled. If the in-execution input is not selected as the to-be-cancelled target (the result in S409 is No), the CPU 11 skips S410 and causes the processing to proceed to S411.

If a completed input is selected as the to-be-cancelled target (the result in S411 is Yes), the CPU 11 deletes input data, stored in the RAM 13, corresponding to the completed input selected as the to-be-cancelled target (S412) and causes the processing to proceed to S413. If a completed input is not selected as the to-be-cancelled target (the result in S411 is No), the CPU 11 skips S412 and causes the processing to proceed to S413.

If a non-executed input is selected as the to-be-cancelled target (the result in S413 is Yes), the CPU 11 turns off the planned input flag corresponding to the non-executed input selected as the to-be-cancelled target (S414), terminating the job cancel processing. As a result of processing in S414, execution of the non-executed input, that is, the job planned to be input is cancelled. If a non-executed input is not selected as the to-be-cancelled target (the result in S413 is No), the CPU 11 skips S414, terminating the job cancel processing.

If, in S402, the phase of the action being executed is an in-execution output (the result in S402 is "in-progress output"), the CPU 11 executes the processing in S415 to S425. Specifically, the CPU 11 sets input data, obtained in each job, which is stored in the RAM 13, as a candidate to be cancelled (S415).

Next, according to the state of the planned output flag, the CPU 11 determines whether there is a non-executed output, that is, a job planned to be output (S416). If the CPU 11 determines that there is a non-executed output (the result in S416 is Yes), the CPU 11 sets the non-executed output as a candidate to be cancelled (S417) and causes the processing to proceed to S418. If the CPU 11 determines that there is no non-executed output (the result in S416 is No), the CPU 11 skips S417 and causes the processing to proceed to S418.

In S418, the CPU 11 displays the input data, which has been set as a candidate to be cancelled in S415, the non-executed output, which has been set as a candidate to be cancelled in S417, and an in-execution output on the LCD 16 in a form in which they can be selected. An in-execution output is a job that is intended to be executed by an output device registered for an action to be executed and is being executed; an in-execution output is neither a non-executed output nor a completed output. The CPU 11 waits until the user selects a to-be-cancelled target from the candidate to be cancelled or the in-execution output, which have been displayed in S418 (the result in S419 is No).

If the in-execution output is selected as the to-be-cancelled target (the result in S419 is Yes and the result in S420 is Yes), the CPU 11 outputs a cancel command to the output device corresponding to the in-execution output that has been selected as the to-be-cancelled target (S421) and causes the processing to proceed to S422. As a result in the processing in S421, the job being executed in the target output device, that is, the output function being executed is cancelled. If the in-execution output is not selected as the to-be-cancelled target (the result in S420 is No), the CPU 11 skips S421 and causes the processing to proceed to S422.

If a non-executed output is selected as the to-be-cancelled target (the result in S422 is Yes), the CPU 11 turns off the planned output flag corresponding to the non-executed output selected as the to-be-cancelled target (S423) and causes the processing to proceed to S424. As a result in the processing in S423, the non-executed output, that is, the job planned to be output, is cancelled. If a non-executed output is not selected as the to-be-cancelled target (the result in S422 is No), the CPU 11 skips S423 and causes the processing to proceed to S424.

If input data is selected as the to-be-cancelled target (the result in S424 is Yes), the CPU 11 deletes relevant input data stored in the RAM 13 (S425), terminating the job cancel processing. Input data to be cancelled may be selected for each job. In this case, in S425, the CPU 11 can delete input data for the job selected as the to-be-cancelled target. If input data is not selected as the to-be-cancelled target (the result in S424 is No), the CPU 11 skips S425, terminating the job cancel processing.

Figures 5D, 5E:
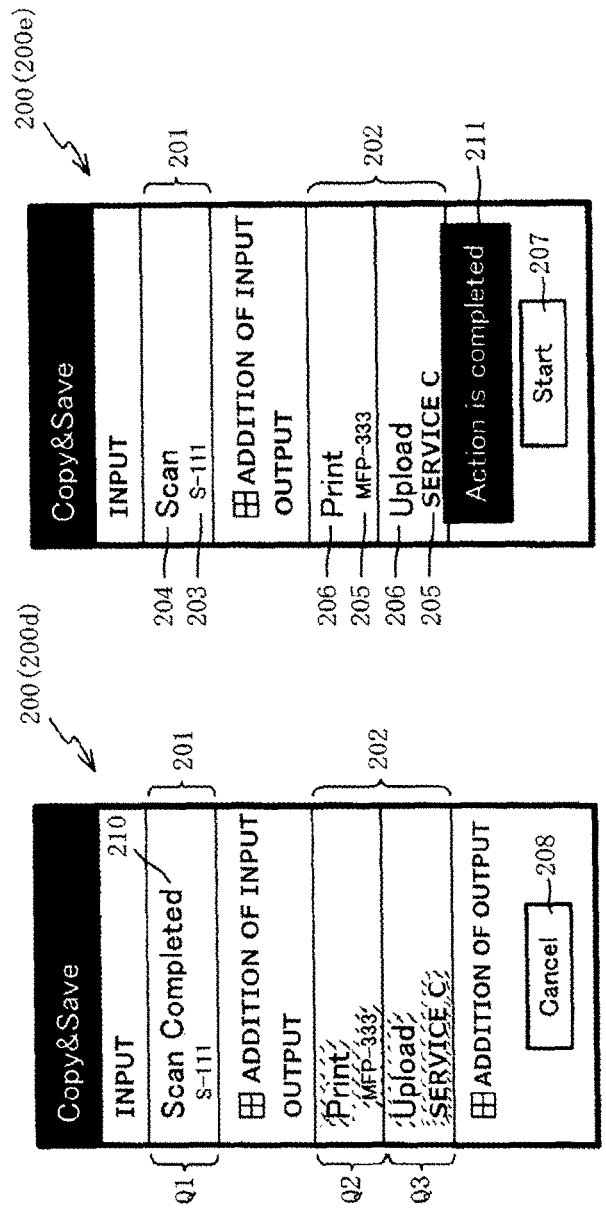

FIGS. 5A to 5E each schematically illustrate an example of the action execution screen 200 displayed on the LCD 16. The action execution screens 200a to 200e, which are respectively illustrated in FIGS. 5A to 5E, are screens at different times during the display of the action execution screen 200. The action execution screen 200a in FIG. 5A is an example of a screen displayed before the action execution processing (S213 in FIG. 2B) is started. The action execution screen 200a is displayed when the processing in S211 in the main processing (see FIG. 2B) is executed.

As illustrated in FIG. 5A, the action execution screens 200 including the action execution screen 200a have an area 201, in which input devices registered for the action, corresponding to the relevant action execution screen 200, that is to be executed are displayed individually, and also have an area 202, in which output devices are displayed individually. In the area 201, information 203, one information item 203 being configured to identify one input device, and information 204 that identifies an input function that the input device executes are displayed. In the example in FIG. 5A, one input device is displayed in the area 201. As the information 203 for the input device, the model name S-111 of the scanner 60, which is the input device, is displayed. As the information 204, Scan indicating a scan function is displayed.

In the area 202, information 205, one information item 205 being configured to identify one output device, and information 206 that identifies an output function executed by the output device are displayed. In the example in FIG. 5A, two output devices are displayed in the area 202. As the information 205 for one of the two output devices, the model name MFC-333 of the MFP 80, which functions as an output device, is displayed; as its corresponding information 206, Print indicating a print function is displayed. As the information 205 for the other output device, the service name Service C of the service provided by the service providing server 100c, which functions as an output device, is displayed; as its corresponding information 206, Upload indicating an upload function is displayed.

On the action execution screen 200a displayed as the result of the processing in S211, the Start button 207 is displayed that commands the start of an action to be executed. When the user taps the Start button 207, the action execution processing in S213 in FIG. 2B is started. Then, the job (that is, the input function) identified by the information 204 will be executed in the input device identified by the information 203 and the job (that is, the output function) identified by the information 206 will be executed in the output device identified by the information 205. From the information items 203 to 206 displayed on the action execution screen 200a, therefore, the user can comprehend jobs to be executed in an action executed when the user taps the Start button 207. That is, the user can comprehend input jobs and output jobs that constitute one or a plurality of main functions implemented in the action to be executed with reference to the display on the action execution screen 200a.

If at least one input device and output device pair has been registered, the Start button 207, which commands the start of an action to be executed, is displayed on the action execution screen 200a displayed as the result in the processing in S211. That is, the Start button 207 is displayed on the action execution screen 200 when at least one main function is executable. Therefore, if at least one of an input device and an output device has not been stored, the Start button 207 is not displayed. This prevents the user from tapping the Start button 207 to attempt to execute a main function in spite of a situation in which a main function cannot be executed.

When the action execution processing is started in response to the user's tapping of the Start button 207 and the processing in S301 is then executed, the Cancel button 208 is displayed on the action execution screen 200 instead of the Start button 207. The user can tap the Cancel button 208 to cancel the action that has been started by tapping the Start button 207.

When the action is started, job-executing input devices or output devices are displayed in a different form from other input devices and output devices in the areas 201 and 202, as illustrated in FIGS. 5B to 5D. In the examples in FIGS. 5B to 5D, the job-executing input device Q1 is normally displayed and the other output devices Q2 and Q3 are grayed out. In FIGS. 5B to 5D, the grayed-out display is represented by hatching. Therefore, the user can identify job-executing input devices or output devices according to a difference in display forms.

The action execution screen 200b in FIG. 5B is an example of a screen displayed when the job-executing input device Q1 has not yet started the job. The action execution screen 200b is displayed as a result of the processing in S304 in the action execution processing in FIG. 3A. On the action execution screen 200b, the information 204 about the job-executing input device Q1, that is, information that identifies an input function to be executed by the job-executing input device Q1, is displayed. When the job-executing device is the output device Q2 or Q3, information that identifies an output function executed by the output device Q2 or Q 3 targeted at the job is also displayed on the action execution screen 200 equivalent to the action execution screen 200b.

The action execution screen 200c in FIG. 5C is an example of a screen displayed while the job-executing input device Q1 is executing a job. The action execution screen 200c is displayed as a result of the processing in S306 in the action execution processing in FIG. 3A. On the action execution screen 200c, an input in-progress status 209 of the job-executing input device Q1 is displayed. When the job-executing device is the output device Q2 or Q3, an output in-progress status indicating that the job-executing device Q2 or Q3 is executing a job, which is an output function, is also displayed on the action execution screen 200 equivalent to the action execution screen 200c.

The action execution screen 200d in FIG. 5D is an example of a screen displayed when the job-executing input device Q1 has completely executed the job. The action execution screen 200d is displayed as a result of the processing in S309 in the action execution processing in FIG. 3A. On the action execution screen 200d, an input completion status 210 of the job-executing input device Q1 is displayed. When the job-executing device is the output device Q2 or Q3, an output completion status indicating that the job-executing output device Q2 or Q3 has completely executed a job, which is an output function, is also displayed on the action execution screen 200 equivalent to the action execution screen 200d.

Since the information 204, input in-progress status 209 (or output in-progress status), and input completion status 210 (or output completion status) are displayed on the action execution screens 200b, 200c, and 200d, the user can comprehend the statuses of the input devices or output devices registered for an action to be executed. Therefore, the user can comprehend the status of the action, to be more specific, the main functions included in the action eligible for being executed with reference to the displays on the action execution screens 200b to 200d, so the user can easily determine a time at which to cancel the action or a main function.

The action execution screen 200e in FIG. 5E is an example of a screen displayed when an intended action has been completely executed. The action execution screen 200e is displayed as a result of the processing in S322 in the action execution processing in FIG. 3B. An action completion status 211 is displayed on the action execution screen 200e. Therefore, the user can know that the action eligible for being executed, to be more specific, all main functions included in the action eligible for being executed, has been completely executed. At a point in time at which the action execution screen 200e is displayed, therefore, the user can comprehend a status in which the user cannot cancel the action has been already entered.

On the action execution screen 200e, the Start button 207 is displayed again instead of the Cancel button 208. In the areas 201 and 202 on the action execution screen 200e, information items 203 and 206 are displayed as on the action execution screen 200a, which is displayed before the action is started. In a case as well in which the Cancel button 208 is tapped, the action execution screen 200e is finally displayed. From the information items 203 to 206 displayed on the action execution screen 200e, therefore, the user can comprehend the type of the job that has been originally intended to be executed by the action canceled in response to a tap of the Cancel button 208.

Since the Start button 207 is displayed on the action execution screen 200e, the user can re-execute a job of the cancelled action again by tapping the Start button 207 again if the user determines that re-execution of the job is needed by checking each job or a main function formed with a combinations of jobs with reference to the information items 203 to 206 displayed on the action execution screen 200e.

As described above, in this embodiment, if the user taps the Cancel button 208 after the start of an action has been started, jobs are cancelled that are included in the input jobs (that is, input functions) or output jobs (that is, output functions) intended to be executed in an action eligible for being executed but have not been completely executed.

Specifically, if there is a job being executed, a cancel command is output to input devices or output devices that are executing the job to have the devices cancel the job. If there is a non-executed job, its planned input flag or planned output flag is turned off to cancel the non-executed job. Accordingly, a job intended to be executed in a plurality of devices can be appropriately canceled by a single tap of the Cancel button 208 according to the status of the job. That is, one or a plurality of main functions included in an action can be appropriately canceled with ease.

When a job intended to be executed in an input device is cancelled, input data received from the input device may have been stored in the RAM 13. In this case, the input data in the RAM 13 is deleted. This prevents data that becomes unnecessary due to the cancellation of the action from being unnecessarily left stored in the RAM 13 and thereby prevents the storage capacity of the RAM 13 from being unnecessarily consumed. Thus, the storage capacity of the RAM 13 can be efficiently used.

When the Cancel button 208 is tapped, cancellable jobs are selectively displayed in the processing in S407 or S418. Therefore, the user can appropriately select desired jobs to be cancelled. Jobs that have not been selected as jobs to be cancelled are executed without being cancelled. Main functions of these non-selected jobs are completely executed. When an action eligible for being executed is to execute a plurality of main functions, therefore, only some main functions can be cancelled and only desired main functions can thereby be executed.

In the embodiment described above: the application 12*b* is an example of an information processing program; the terminal 10 is an example of a terminal apparatus; the scanner 60, printer 70, MFP 80 and service providing server 100 are each an example of an external device; the scanner 60, MFP 80, and service providing server 100 are each an example of an input device; printer 70, MFP 80, and service providing server 100 are each an example of an output device; the CPU 11 is an example of a control unit; the LCD 16 is an example of a display unit; the flash memory 12 is an example of a storage unit; the wireless LAN 500 and Internet 800 are each an example of a network; the action execution screen 200 is an example of a first screen; the information 204 is an example of information that identifies an input function; the information 206 is an example of information that identifies an output function; the input in-progress status 209 and output in-progress status are each an example of information indicating that a sub-function is being executed; the input completion status 210 and output completion status are each an example of information indicating that a sub-function has been completely executed; the action completion status 211 is an example of information indicating that a main function has been completely executed.

The CPU 11 that executes the processing in S216 is an example of a device setting means. The CPU 11 that executes the processing in S213 is an example of a main function execution means. The CPU 11 that executes the processing in S401 is an example of a command acceptance means. The CPU 11 that executes the processing in S410, S414, S421, and S423 is an example of a cancel execution means; The CPU 11 that executes the processing in S407 and S418 is an example of a first display control means. The CPU 11 that executes the processing in S308 is an example of a reception means. The CPU 11 that executes the processing in S412 and S425 is an example of a deletion means. The CPU 11 that executes the processing in S211 is an example of a second display control means. The CPU 11 that executes the processing in S321 is an example of a third display control means. The CPU 11 that executes the processing in S306 and S316 is an example of a fourth display control means. The CPU 11 that executes the processing in S309 and S319 is an example of a fifth display control means. The CPU 11 that executes the processing in S322 is an example of a sixth control means.

The processing in S216 is an example of device setting processing. The processing in S213 is an example of main function execution processing. The processing in S401 is an example of command acceptance processing. The processing in S410, S414, S421, and S423 is an example of cancel execution processing. The processing in S407 and S418 is an example of first display control processing. The processing in S308 is an example of reception processing. The processing in S412 and S425 is an example of deletion processing. The processing in S211 is an example of second display control processing. The processing in S321 is an example of third display control processing. The processing in S306 and S316 is an example of fourth display control processing. The processing in S309 and S319 is an example of fifth display control processing. The processing in S322 is an example of sixth control processing.

So far, the present invention has been described according to an embodiment, but the present invention is not limited to the embodiment described above; it is easily understood that various improvements and modifications are possible without departing from the intended scope of the present invention. For example, although, in the above embodiment, the application 12*b* has been installed in the terminal 10, the terminal in which to install the application 12*b* is not limited to the terminal 10 exemplified above; application 12*b* may be installed in a tablet terminal, a digital camera, a personal computer, and the like.

The application 12*b* may be installed in a server so that it functions like the terminal 10 in the embodiment described above. In this case, main functions that have not been completely executed can be cancelled from a smart phone or another terminal through the server. If, for example, the server receives a cancel command from the smart phone, when the server outputs the cancel command to an input device and output device that are executing a job, the job being executed, that is, an input function or output function being executed, can be cancelled.

When the application 12*b* is installed in a server so that is functions like the terminal 10, the server may display indications displayed in S407 and S418 on the display unit of the smart phone or another terminal, the indications being displayed so that the user can select a to-be-cancelled target. Similarly, the server may display the input in-progress status 209, output in-progress status, input completion status 210, output completion status, action completion status 211, and other information indicating the status of each job or action on the display unit of the smart phone or another terminal.

Although, in the above embodiment, an Android (registered trademark) OS has been exemplified as the OS 12*a* installed in the terminal 10, another OS may be used.

Although, in the above embodiment, the scanner 60 and MFP 80 have been exemplified as a device that becomes an input device candidate, this is not a limitation; another device may be used if it can execute an input function, that is, a function of retrieving data that the terminal, in which the application 12*b* is installed, will receive as input data or a function of reading the data from a storage unit. Examples of usable input devices include a facsimile machine that receives facsimile data as input data and a database server that stores data to be read as input data. Similarly, a device that can execute an output function can be used as a device that becomes an output device candidate. Examples of usable output devices include a 3D printer that performs three-dimensional printing by using print data for three-dimensional printing as output data, a sewing machine that performs embroidery by using embroidery data as output data, and a projector that projects an image by using projection data as output data.

Although, in the action execution processing in the embodiment described above, jobs in input devices have been executed one at a time, this is not a limitation; jobs in a plurality of input devices may be concurrently executed. Similarly, jobs in a plurality of output devices may be concurrently executed. In the action execution processing in the embodiment described above, after all input devices had completed jobs, jobs in output devices have been executed, but jobs in input devices and jobs in output devices may be concurrently executed. If, for example, a plurality of input devices are registered, each time a job in one input device is completed, output devices may not wait until jobs executed by other input devices are completed; the output devices may use input data obtained from the job that has been executed by the one input device to execute jobs.

If a plurality of jobs are concurrently executed as described above, a plurality of jobs that can become a to-be-cancelled target may be being executed. Therefore, in S408 or S419 in the job cancel processing, which is executed when the Cancel button 208 is tapped, the CPU 11 may determine whether a plurality of jobs are being executed. If the CPU 11 makes an affirmative decision, the CPU 11 may execute processing to set any one of the plurality of jobs being executed as the to-be-cancelled target. In this variation, only some functions of the plurality of jobs being executed (for example, jobs selected by the user) can be cancelled.

Although, in the embodiment described above, the user has been able to select a job to be cancelled, a cancel command may be output to input devices or output devices that are executing a job and to input devices or output devices that have not yet executed a job, instead of having the user select a to-be-cancelled target. Alternatively, a cancel command may be output to input devices or output devices that are executing a job or to input devices or output devices that have not yet executed a job.

Although, in the embodiment described above, upon completion of the execution of one action, the Start button 207 has been displayed on the action execution screen 200 in S321 in FIG. 3B, the Start button 207 may not be displayed on the action execution screen 200. Although, in the embodiment described above, the Start button 207 or Cancel button 208 has been exclusively displayed on the action execution screen 200, both the Start button 207 and Cancel button 208 may be displayed on the action execution screen 200 so that one button is displayed in a form it can be manipulated and the other button is displayed in gray or in another form in which it cannot be manipulated.

In the embodiment described above, when an action eligible for being executed has been completely executed, that is, all main functions included in the action have been completely executed, the action completion status 211 has been displayed on the action execution screen 200 (200e). Instead, each time an output job has been executed in an output device, information indicating that main functions using the output job have been completely executed may be displayed on the action execution screen 200.

Although, in the above embodiment, the CPU 11 has executed the processing illustrated in FIGS. 2 to 4, a plurality of CPUs may execute the processing in these drawings in collaboration. Alternatively, application-specific integrated circuits (ASICs) and other types of ICs may execute the processing in these drawings independently or in collaboration. Alternatively, the CPU 11 and ICs such as ASICs may execute the processing in these drawings in collaboration.

What is claimed is:
1. A terminal apparatus comprising:
a communication unit communicable with a plurality of external devices via a network; and
a controller, wherein the controller is configured to execute:
device setting processing in which an input device that executes an input function and an output device that executes an output function are set, the input device being one of the plurality of external devices connected to the network and the output device being another of the plurality of external devices connected to the network, the input function being a first sub-function of a main function and the output function being a second sub-function of the main function;
main function execution processing in which the main function including the input function as the first sub-function and the output function as the second sub-function is executed, and in which the input device and the output device set in the device setting processing execute the input function and the output function, respectively:
command acceptance processing in which a first cancel command, which commands cancellation of execution of the main function being executed in the main function execution processing, is accepted; and
cancel execution processing in which:
when the first cancel command is accepted in the command acceptance processing, if the input device has not completely executed the input function, execution of the input function that has not been completely executed is cancelled; and
when the first cancel command is accepted in the command acceptance processing, if the output device has not completely executed the output function, execution of the output function that has not been completely executed is cancelled,
wherein when the first cancel command is accepted in the command acceptance processing, the controller executes first display control processing in which the input device or the output device in which execution of the input function or the output function is capable of being cancelled is indicated on a display for selection to be cancelled, and
wherein in the cancel execution processing, the controller cancels execution of the input function and the output function in the input device or the output device, in which execution of the input function and the output function has been selected for cancellation and which is indicated in the first display control processing.
2. The terminal apparatus according to claim 1, wherein:
when the first cancel command is accepted in the command acceptance processing, if the input device is executing the input function, the controller outputs a second cancel command to the input device via the network in the cancel execution processing; and
when the first cancel command is accepted in the command acceptance processing, if the output device is executing the output function, the controller outputs a second cancel command to the output device via the network in the cancel execution processing,
wherein the second cancel command commands cancellation of the input function or the output function being executed.

3. The terminal apparatus according to claim 2, wherein:
the controller is configured to, in the device setting processing, set a plurality of external devices as input devices or output devices that is used to execute one main function;
when the first cancel command is accepted in the command acceptance processing, if a plurality of input devices or output devices have been set in the device setting processing, the controller executes first determining processing in which the controller determines whether at least two input devices or output devices of the plurality of input devices or output devices set in the device setting processing are executing the input function or the output function;
if it is determined in the first determining processing that the at least two input devices or output devices are executing the input function or the output function, the controller executes target setting processing in which an input device or an output device of the at least two input devices or output devices that are executing the input function or the output function is set as a target input device or a target output device in which execution of the input function or the output function is to be cancelled; and
in the cancel execution processing, the controller outputs the second cancel command to the target input device or the target output device that has been set in the target setting processing.

4. The terminal apparatus according to claim 1, wherein when the first cancel command is accepted in the command acceptance processing, if the input device has not yet executed the input function, the controller cancels execution of the input function in the cancel execution processing, and if the output device has not yet executed the output function, the controller cancels execution of the output function in the cancel execution processing.

5. The terminal apparatus according to claim 1, further comprising a storage unit, wherein the controller is configured to further execute
reception processing in which data that the input device obtains by executing the input function is received from the input device as input data,
storage control processing in which the input data received in the reception processing is stored in the storage unit, and
deletion processing in which when the first cancel command is received in the command acceptance processing, if the input data has been stored in the storage unit, the input data is deleted from the storage unit.

6. The terminal apparatus according to claim 1, wherein:
the controller is configured to execute second display control processing in which a first screen is displayed on a display, a start button being displayed on the first screen together with indications of the input device and the output device that have been set in the device setting processing, the start button commanding start of execution of the main function including the input function executed by the input device and the output function executed by the output device;
in the main function execution processing, when the controller accepts a manipulation of the start button, the controller causes the input device and the output device that have been set in the device setting processing to execute the main function; and
when, in the command acceptance processing, the controller accepts the first cancel command during execution of the main function in the main function execution processing, the controller executes third display control processing in which the first screen including at least indications of the input device and the output device that have been set in the device setting processing are displayed on the display.

7. The terminal apparatus according to claim 1, wherein:
the controller executes second display control processing in which a first screen is displayed on a display, a start button being displayed on the first screen together with indications of the input device and the output device that have been set in the device setting processing, the start button commanding start of execution of the main function including the input function executed by the input device and the output function executed by the output device; and
in the second display control processing, the controller displays, on the first screen, information that identifies the input function executed by the input device and the output function executed by the output device, the input device and the output device having been set in the device setting processing.

8. The terminal apparatus according to claim 1, wherein the controller is configured to execute fourth display control processing in which information indicating that input function or the output function has been completely executed in the input device or the output device is displayed on a display.

9. The terminal apparatus according to claim 1, wherein the controller executes fifth display control processing in which when the input function intended to be executed by the input device and the output function intended to be executed by the output device have been completely executed, the controller displays, on a display, information indicating that the main function including the input function and the output function has been completely executed.

10. A terminal apparatus comprising:
a communication unit communicable with a plurality of external devices via a network; and
a controller, wherein the controller is configured to execute:
device setting processing in which an input device that executes an input function and an output device that executes an output function are set, the input device being one of the plurality of external devices connected to the network and the output device being another of the plurality of external devices connected to the network, the input function being a first sub-function of a main function and the output function being a second sub-function of the main function;
main function execution processing in which the main function including the input function as the first sub-function and the output function as the second sub-function is executed, and in which the input device and the output device set in the device setting processing execute the input function and the output function, respectively:
command acceptance processing in which a first cancel command, which commands cancellation of execution of the main function being executed in the main function execution processing, is accepted;
display control processing in which information indicating that the input function or the output function is being executed in the input device or the output device is displayed on a display; and
cancel execution processing in which:
when the first cancel command is accepted in the command acceptance processing, if the input device has not completely executed the input function, execution of the input function that has not been completely executed is cancelled; and when the first cancel command is accepted in the command acceptance processing, if the output device has not completely executed the output function, execution of the output function that has not been completely executed is cancelled.

11. The terminal apparatus according to claim 10, wherein:
when the first cancel command is accepted in the command acceptance processing, the controller executes further display control processing in which the input device or the output device in which execution of the input function or the output function is capable of being cancelled is indicated on a display for selection to be cancelled; and in the cancel execution processing, the controller cancels execution of the input function and the output function in the input device or the output device, in which execution of the input function and the output function has been selected for cancellation and which is indicated in the further display control processing.

12. A non-transitory computer readable medium bearing instructions, the instructions, when executed by a processor, cause a terminal apparatus to execute:
device setting processing in which an input device that executes an input function and an output device that executes an output function are set, the input device being one of a plurality of external devices connected to a network and the output device being another of the plurality of external devices connected to the network, the input function being a first sub-function of a main function and the output function being a second sub-function of the main function;

main function execution processing in which the main function including the input function as the first sub-function and the output function as the second sub-function is executed, and in which the input device and the output device set in the device setting processing execute the input function and the output function, respectively:

command acceptance processing in which a first cancel command, which commands cancellation of execution of the main function being executed in the main function execution processing, is accepted; and cancel execution processing in which:
when the first cancel command is accepted in the command acceptance processing, if the input device has not completely executed the input function, cancel execution of the input function that has not been completely executed; and when the first cancel command is accepted in the command acceptance processing, if the output device has not completely executed the output function, cancel execution of the output function that has not been completely executed, wherein when the first cancel command is accepted in the command acceptance processing, execute first display control processing in which the input device or the output device in which execution of the input function or the output function is capable of being cancelled is indicated on a display for selection to be cancelled, and wherein in the cancel execution processing, cancel execution of the input function and the output function in the input device or the output device, in which execution of the input function and the output function has been selected for cancellation and which is indicated in the first display control processing.

13. The non-transitory computer readable medium according to claim 12, wherein the instructions, when executed by the processor, cause the terminal apparatus to:
when the first cancel command is accepted in the command acceptance processing, if the input device is executing the input function, output a second cancel command to the input device via the network in the cancel execution processing; and when the first cancel command is accepted in the command acceptance processing, if the output device is executing the output function, output a second cancel command to the output device via the network in the cancel execution processing, wherein the second cancel command commands cancellation of the input function or the output function being executed.

14. The non-transitory computer readable medium according to claim 13, wherein the instructions, when executed by the processor, cause the terminal apparatus to:
in the device setting processing, set a plurality of external devices as input devices or output devices that is used to execute one main function;

when the first cancel command is accepted in the command acceptance processing, if a plurality of input devices or output devices have been set in the device setting processing, execute first determining processing in which it is determined whether at least two input devices or output devices of the plurality of input devices or output devices set in the device setting processing are executing the input function or the output function;

if it is determined in the first determining processing that the at least two input devices or output devices are executing the input function or the output function, execute target setting processing in which an input device or an output device of the at least two input devices or output devices that are executing the input function or the output function is set as a target input device or a target output device in which execution of the input function or the output function is to be cancelled; and in the cancel execution processing, output the second cancel command to the target input device or the target output device that has been set in the target setting processing.

15. The non-transitory computer readable medium according to claim 12, wherein the instructions, when executed by the processor, cause the terminal apparatus to, when the first cancel command is accepted in the command acceptance processing, if the input device has not yet executed the input function, cancel execution of the input function in the cancel execution processing, and if the output device has not yet executed the output function, cancel execution of the output function in the cancel execution processing.

16. The non-transitory computer readable medium according to claim 12, wherein the instructions, when executed by the processor, cause the terminal apparatus to execute:
reception processing in which data that the input device obtains by executing the input function is received from the input device as input data, storage control processing in which the input data received in the reception processing is stored in a storage unit, and deletion processing in which when the first cancel command is received in the command acceptance processing, if the input data has been stored in the storage unit, the input data is deleted from the storage unit.

17. The non-transitory computer readable medium according to claim 12, wherein the instructions, when executed by the processor, cause the terminal apparatus to:
- execute second display control processing in which a first screen is displayed on a display, a start button being displayed on the first screen together with indications of the input device and the output device that have been set in the device setting processing, the start button commanding start of execution of the main function including the input function executed by the input device and the output function executed by the output device;
- in the main function execution processing, when the controller accepts a manipulation of the start button, cause the input device and the output device that have been set in the device setting processing to execute the main function; and
- when, in the command acceptance processing, the first cancel command during execution of the main function in the main function execution processing is accepted, execute third display control processing in which the first screen including at least indications of the input device and the output device that have been set in the device setting processing are displayed on the display.

18. The non-transitory computer readable medium according to claim 12, wherein the instructions, when executed by the processor, cause the terminal apparatus to:
- execute second display control processing in which a first screen is displayed on a display, a start button being displayed on the first screen together with indications of the input device and the output device that have been set in the device setting processing, the start button commanding start of execution of the main function including the input function executed by the input device and the output function executed by the output device; and
- in the second display control processing, display, on the first screen, information that identifies the input function executed by the input device and the output function executed by the output device, the input device and the output device having been set in the device setting processing.

19. The non-transitory computer readable medium according to claim 12, wherein the instructions, when executed by the processor, cause the terminal apparatus to execute fourth display control processing in which information indicating that the input function or the output function is being executed in the input device or the output device is displayed on a display.

20. The non-transitory computer readable medium according to claim 12, wherein the instructions, when executed by the processor, cause the terminal apparatus to execute fifth display control processing in which information indicating that input function or the output function has been completely executed in the input device or the output device is displayed on a display.

* * * * *